May 16, 1967     L. BERTELE     3,320,015
WIDE-ANGLE OBJECTIVE
Filed March 13, 1963
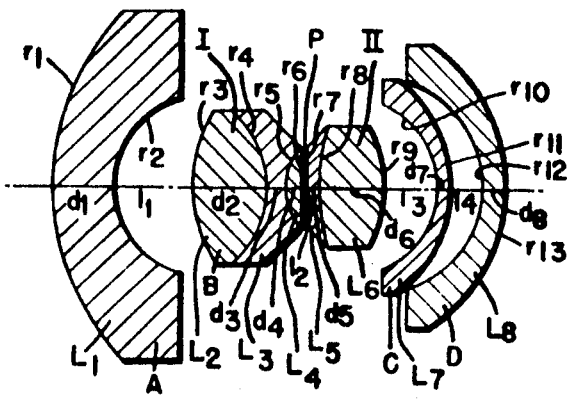
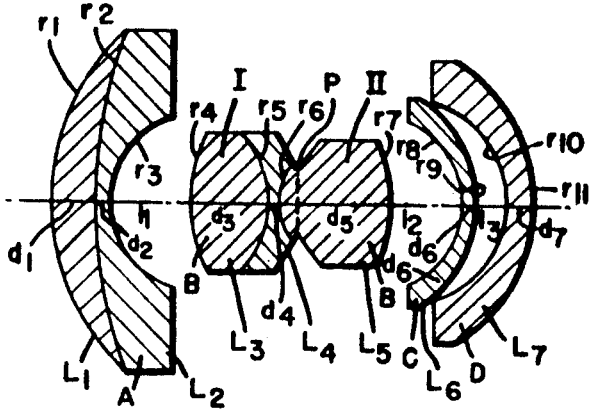
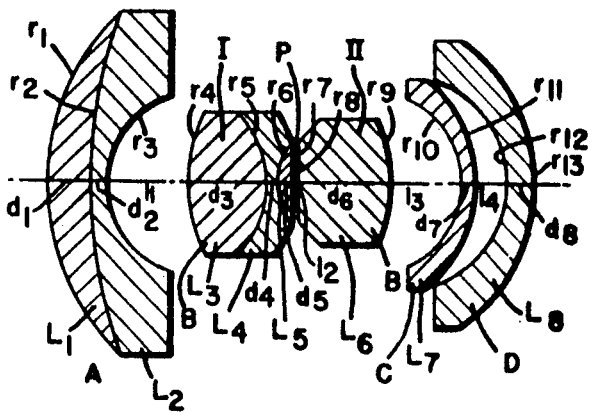
Ludwig Bertele
INVENTOR
BY Dezsoe Steinherz
ATTORNEY

3,320,015
WIDE-ANGLE OBJECTIVE
Ludwig Bertele, Heerbrugg, Switzerland, assignor of one-half to Wild Heerbrugg Aktiengesellschaft, Heerbrugg, Switzerland
Filed Mar. 13, 1963, Ser. No. 264,866
Claims priority, application Switzerland, Mar. 15, 1962, 3,137/62
3 Claims. (Cl. 350—216)

The present invention relates to a wide-angle objective for picture-taking and for projection, in which the lens members are arranged in such manner that a collective lens member is embraced on one side by a diverging meniscus and on the other side by two diverging menisci with the formation of air spaces. The beforementioned three menisci have their concave surfaces turned to the collective inner member, in which the pupil, i.e. the narrowest constriction of rays, is located. If the diameter of the pupil has always the same size, a cut in the collective lens member is sufficient. If the diameter is variable, into the beforementioned lens member a small air space must be inserted. Thus, the inner member is composed of one part located in front of the plane of the pupil and one part located behind the plane of the pupil and it is thereby irrelevant whether the pupil lies in the glass medium or in the air.

In such a sequence of lenses, it is possible, at an aperture ratio of about 1:8, to attain an image angle of 120° and more if according to the invention, in that part of the positive lens member which adjoins the single meniscus, at least two cemented surfaces are inserted and are so designed that they turn their convex surfaces toward each other and have a collective effect. This requirement is met if the refractive index on the convex side of the cemented surface which is nearer to the pupil, is smaller than on the concave side thereof and the refractive index on the concave side of the second cemented surface is likewise smaller than on the concave side thereof. Investigations have shown that by means of this step a satisfactory correction of the comatic aberrations can be attained for all light beams which are obliquely incident within the claimed image angle. It is advantageous to have the cemented surface which lies nearer to the pupil curved stronger than the cemented surface which is at a greater distance from it.

If such an objective is used for a projection with variable enlargement, or if measurements in a certain range of depth of a projected image are carried out, for example in the use of photogrammetric plotting apparatus, it is necessary, primarily in view of freedom from distortion in all magnification ranges, to have an image free from aberration of the primary principal point to the secondary principal point, while meeting the sinus-condition over the entire angular aperture corresponding to the image angle. It has been found that the conditions are met, particularly if the quotient between the numerical sum of the radii of curvature of the convex outer surfaces of the positive inner member, on the one hand and the distance between these surfaces on the other hand, is larger than 1.3 and smaller than 4. Tests have shown that if the limits are larger than 1.3 and smaller than 4, the best corrections for image defects can be obtained at this extremely larger image angle of 120°. The focal length of the diverging single meniscus which is vicinal to the inner part, provided with the above described cemented surfaces, is in the range between —0.6 F and —1.4 F, F being the total focal length of the objective. If the image of the primary principal point to the secondary principal point is supposed to be achromatized also for a larger spectral region, the designing of the diverging single meniscus as a cemented member is indispensable in such manner that the positive lens consists of heavy flint glass and the negative lens consists of a glass which has as little color dispersion as possible. It is within the scope of the present invention to insert further cemented surfaces into the lens members in order to further reduce specific aberrations.

FIGS. 1, 2 and 3 each represents sectional views showing the form and arrangement of the objective lenses according to the present invention depicting the notations employed in the numerical Examples 1, 2 and 3.

In the following, three working examples, in which the focal lengths amount to $F=100$, are given. The individual lenses are denoted L. The individual lens members are denoted A to D. Lens member B consists of the two parts I and II which are separated by the pupil P. The image angle amounts to about 120° at an aperture ratio of 1:8.

*Example 1*

Example 1 consists of the individual lenses $L_1$ to $L_8$. $L_1$ is an uncemented diverging meniscus. $L_2$ to $L_4$ are cemented together to form lens member I. Lens member II consists of the two cemented lenses $L_5$ and $L_6$. Lenses $L_7$ and $L_8$ are centering menisci which turn their concave side to the pupil. In lens member B the radii $r_4$ and $r_5$ represent the collective cementing surfaces, which turn their convex surfaces to each other. The surface $r_6$ is provided nearer to the diaphragm bordering on air space $l_2$ with a curvature of 22.78, i.e. it is stronger curved than the surface $r_4$ which is at a greater distance and has a curvature of 40.75. The quotient from the numerical sum of $r_3$ and $r_9=139.7$ and of the distance from $r_4$ to $r_9=80.26=0.803$ F amounts to 1.74. The focal length of the single meniscus A is $-1.02$ F.

*Example 2*

In a magnification objective, the cementing surfaces in lens member B denoted by radii $r_5$ and $r_6$ turn their convex surfaces to each other. The surface $r_6$ which is nearer to the pupil indicated by the cut, has a curvature corresponding to 24.06, and is stronger curved than the surface $r_5$ with a curvature of 36.5, which is at a greater distance. The quotient from the numerical sum of $r_4$ and $r_7=144.74$ and of the distance from $r_4$ to $r_7=78.93=0.789$ F, amounts to 1.83. The focal length of the single meniscus A is $-1.05$ F.

*Example 3*

This is an objective for photogrammetric plotting in which the image of the primary principal point to the secondary principal point is practically free up to an aperture angle of ±60° from spherical aberration if the sinus condition is observed. This correction extends still further over a larger spectral region. This objective is preferably used for an eightfold magnification and, thereby, the longer conjugate is on the side of the cemented single meniscus.

In lens member B all collecting surfaces $r_5$ and $r_6$ turn their convex surfaces toward each other. The surface $r_6$ which lies nearer to the diaphragm with a curvature of 24.43, is stronger curved than the surface $r_5$ which is at a greater distance and has a curvature of 37.65. The quotient from the numerical sum of $r_4$ and $r_9=141.71$ and of the distance from $r_4$ to $r_9=141.71$ and of the distance $r_4$ to $r_9=77.5=0.775$ F, amounts to 1.83. The focal strength of the single meniscus A is $-1.055$ F.

The radii of curvature of the lens surfaces are denoted herein $r$;
The thicknesses of the lenses are denoted $d$;
The air spaces are denoted $l$;
The refraction numbers for the helium line are denoted $n_d$;
The Abbé numbers are denoted $\nu$.

EXAMPLE 1

| Lens | Radius of curvature | Thickness or air space | Kinds of glass | |
|---|---|---|---|---|
| | | | $n_d$ | $\nu$ |
| L1 | $r_1 = +103.8$ | $d_1 = 25.31$ | 1.69651 | 55.6 |
| | $r_2 = +37.96$ | $l_1 = 34.17$ | | |
| L2 | $r_3 = +69.85$ | $d_2 = 31.63$ | 1.72952 | 36.6 |
| | $r_4 = -40.75$ | | | |
| L3 | $r_5 = +22.78$ | $d_3 = 9.11$ | 1.69823 | 31.1 |
| L4 | $r_6 = +2842.4$ | $d_4 = 6.83$ | 1.71317 | 36.5 |
| | $r_7 = -2480.3$ | $l_2 = 0.30$ | | |
| L5 | $r_8 = +101.0$ | $d_5 = 4.39$ | 1.71079 | 29.7 |
| L6 | $r_9 = -69.85$ | $d_6 = 28.0$ | 1.71079 | 53.9 |
| | $r_{10} = -36.7$ | $l_3 = 29.61$ | | |
| L7 | $r_{11} = -54.57$ | $d_7 = 4.05$ | 1.48744 | 70.0 |
| | $r_{12} = -43.96$ | $l_4 = 13.64$ | | |
| L8 | $r_{13} = -71.72$ | $d_8 = 6.33$ | 1.48744 | 70.0 |

EXAMPLE 2

| Lens | Radius of curvature | Thickness or air space | Kinds of glass | |
|---|---|---|---|---|
| | | | $n_d$ | $\nu$ |
| L1 | $r_1 = +96.26$ | $d_1 = 19.25$ | 1.72825 | 28.3 |
| | $r_2 = +216.61$ | | | |
| L2 | $r_3 = +36.91$ | $d_2 = 4.01$ | 1.69680 | 55.6 |
| | $r_4 = +72.86$ | $l_1 = 35.95$ | | |
| L3 | $r_5 = -36.50$ | $d_3 = 32.10$ | 1.7335 | 51.0 |
| L4 | $r_6 = +24.06$ | $d_4 = 3.20$ | 1.7040 | 33.7 |
| L5 | $r_7 = -71.88$ | $d_5 = 43.63$ | 1.7149 | 41.3 |
| | $r_8 = -36.58$ | $l_2 = 30.0$ | | |
| L6 | $r_9 = -54.54$ | $d_6 = 4.01$ | 1.48749 | 70.0 |
| | $r_{10} = -42.85$ | $l_3 = 13.63$ | | |
| L7 | $r_{11} = -70.39$ | $d_7 = 8.3$ | 1.48749 | 70.0 |

EXAMPLE 3

| Lens | Radius of curvature | Thickness or air space | Kinds of glass | |
|---|---|---|---|---|
| | | | $n_d$ | $\nu$ |
| L1 | $r_1 = +99.03$ | $d_1 = 21.36$ | 1.72825 | 28.3 |
| | $r_2 = +213.63$ | | | |
| L2 | $r_3 = +37.26$ | $d_2 = 3.82$ | 1.69680 | 55.6 |
| | $r_4 = +70.65$ | $l_1 = 36.24$ | | |
| L3 | $r_5 = -37.65$ | $d_3 = 31.39$ | 1.72916 | 54.8 |
| L4 | $r_6 = +24.43$ | $d_4 = 4.87$ | 1.69761 | 38.6 |
| L5 | $r_7 = +2543.2$ | $d_5 = 6.10$ | 1.71300 | 53.9 |
| | $r_8 = -2543.2$ | $l_2 = 0.30$ | | |
| L6 | $r_9 = -71.06$ | $d_6 = 34.84$ | 1.7102 | 36.5 |
| | $r_{10} = -36.93$ | $l_3 = 30.26$ | | |
| L7 | $r_{11} = -55.06$ | $d_7 = 4.07$ | 1.4875 | 70.0 |
| | $r_{12} = -43.62$ | $l_4 = 13.73$ | | |
| L8 | $r_{13} = -71.08$ | $d_8 = 9.33$ | 1.4875 | 70.0 |

What is claimed is:

1. A wide-angle objective comprising a compound converging component having two parts one of which is disposed on one side of the diaphragm plane of the objective and the other of which is disposed on the other side of such plane, and three diverging components, the converging component being disposed between one of the diverging components and the remaining two diverging components, each of the three diverging components being concave towards the converging component, and one of the two parts of the converging component that is between said one of the three diverging components and the diaphragm plane containing two cemented surfaces which are collecting and are convex towards each other, each of the two cemented surfaces having a converging effect and these two effects being additive and the other of the two parts having a converging effect, their indices of refraction $n_d$ and their Abbé numbers $\nu$ have numerical values substantially as given in the following table, wherein the symbols designate the following:

L the individual lenses,
$r$ the radii of curvature of the individual surfaces,
$d$ the axial thicknesses of the lenses,
$l$ the air spaces between lenses,
$n_d$ the refractive indices for the helium d-line, and
$\nu$ the Abbé number.

The suffices denote the particular item in sequence from the object side or front of the objective.

| Lens | Radius of curvature | Thickness or air space | Kinds of glass | |
|---|---|---|---|---|
| | | | $n_d$ | $\nu$ |
| L1 | $r_1 = +103.8$ | $d_1 = 25.31$ | 1.69651 | 55.6 |
| | $r_2 = +37.96$ | $l_1 = 34.17$ | | |
| L2 | $r_3 = +69.85$ | $d_2 = 31.63$ | 1.72952 | 36.6 |
| | $r_4 = -40.75$ | | | |
| L3 | $r_5 = +22.78$ | $d_3 = 9.11$ | 1.69823 | 31.1 |
| L4 | $r_6 = +2842.4$ | $d_4 = 6.83$ | 1.71317 | 36.5 |
| | $r_7 = -2480.3$ | $l_2 = 0.30$ | | |
| L5 | $r_8 = +101.0$ | $d_5 = 4.39$ | 1.71079 | 29.7 |
| L6 | $r_9 = -69.85$ | $d_6 = 28.0$ | 1.71079 | 53.9 |
| | $r_{10} = -36.7$ | $l_3 = 29.61$ | | |
| L7 | $r_{11} = -54.57$ | $d_7 = 4.05$ | 1.48744 | 70.0 |
| | $r_{12} = -43.96$ | $l_4 = 13.64$ | | |
| L8 | $r_{13} = -71.72$ | $d_8 = 6.33$ | 1.48744 | 70.0 |

2. A wide-angle objective comprising a compound converging component having two parts one of which is disposed on one side of the diaphragm plane of the objective and the other of which is disposed on the other side of such plane, and three diverging components, the converging component being disposed between one of the diverging components and the remaining two diverging components, each of the three diverging components being concave towards the converging component, and one of the two parts of the converging component that is between said one of the three diverging components and the diaphragm plane containing two cemented surfaces which are collecting and are convex towards each other, each of the two cemented surfaces having a converging effect and these two effects being additive and the other of the two parts having a converging effect, their indices of refraction $n_d$ and their Abbé numbers $\nu$ having numerical values substantially as given in the following table, wherein the symbols designate the following:

L the individual lenses,
$r$ the radii of curvature of the individual surfaces,
$d$ the axial thicknesses of the lenses, $l$ the air spaces between lenses,
$n_d$ the refractive indices for the helium d-line, and
$\nu$ the Abbé number.

The suffices denote the particular item in sequence from the object side or front of the objective.

| Lens | Radius of curvature | Thickness or air space | Kinds of glass | |
|---|---|---|---|---|
| | | | $n_d$ | $\nu$ |
| L1 | $r_1 = +96.26$ | $d_1 = 19.25$ | 1.72825 | 28.3 |
| L2 | $r_2 = +216.61$ | $d_2 = 4.01$ | 1.69680 | 55.6 |
| | $r_3 = +36.91$ | $l_1 = 35.95$ | | |
| L3 | $r_4 = +72.86$ | $d_3 = 32.10$ | 1.7335 | 51.0 |
| L4 | $r_5 = -36.50$ | $d_4 = 3.20$ | 1.7040 | 33.7 |
| L5 | $r_6 = +24.06$ | $d_5 = 43.63$ | 1.7149 | 41.3 |
| | $r_7 = -71.88$ | $l_2 = 30.0$ | | |
| L6 | $r_8 = -36.58$ | $d_6 = 4.01$ | 1.48749 | 70.0 |
| | $r_9 = -54.54$ | $l_3 = 13.63$ | | |
| L7 | $r_{10} = -42.85$ | $d_7 = 8.3$ | 1.48749 | 70.0 |
| | $r_{11} = -70.39$ | | | |

3. A wide-angle objective comprising a compound converging component having two parts one of which is disposed on one side of the diaphragm plane of the objective and the other of which is disposed on the other side of such plane, and three diverging components, the converging component being disposed between one of the diverging components and the remaining two diverging components, each of the three diverging components being concave towards the converging component, and one of the two parts of the converging component that is between said one of the three diverging components and the diaphragm plane containing two cemented surfaces which are collecting and are convex towards each other, each of the two cemented surfaces having a converging effect and these two effects being additive and the other of the two parts having a converging effect, their indices of refraction $n_d$ and their Abbé numbers $\nu$ having numerical values substantially as given in the following table, wherein the symbols designate the following:

$L$ the individual lenses,
$r$ the radii of curvature of the individual surfaces,
$d$ the axial thicknesses of the lenses,
$l$ the air spaces between lenses,
$n_d$ the refractive indices for the helium d-line, and
$\nu$ the Abbé number.

The suffices denote the particular item in sequence from the object side or front of the objective.

| Lens | Radius of curvature | Thickness or air space | Kinds of glass | |
|---|---|---|---|---|
| | | | $n_d$ | $\nu$ |
| L1 | $r_1 = +99.03$ | $d_1 = 21.36$ | 1.72825 | 28.3 |
| L2 | $r_2 = +213.63$ | $d_2 = 3.82$ | 1.69680 | 55.6 |
| | $r_3 = +37.26$ | $l_1 = 36.24$ | | |
| L3 | $r_4 = +70.65$ | $d_3 = 31.39$ | 1.72916 | 54.8 |
| L4 | $r_5 = -37.65$ | $d_4 = 4.87$ | 1.69761 | 38.6 |
| L5 | $r_6 = +24.43$ | $d_5 = 6.10$ | 1.71300 | 53.9 |
| | $r_7 = +2543.2$ | $l_2 = 0.30$ | | |
| | $r_8 = -2543.2$ | | | |
| L6 | $r_9 = -71.06$ | $d_6 = 34.84$ | 1.7102 | 36.5 |
| | $r_{10} = -36.93$ | $l_3 = 30.26$ | | |
| L7 | $r_{11} = -55.06$ | $d_7 = 4.07$ | 1.4875 | 70.0 |
| | $r_{12} = -43.62$ | $l_4 = 13.73$ | | |
| L8 | $r_{13} = -71.08$ | $d_8 = 9.33$ | 1.4875 | 70.0 |

References Cited by the Examiner

UNITED STATES PATENTS 2,721,499 10/1955 Bertele _____ 88—57
3,039,361 6/1962 Baker _____ 88—57
3,154,628 10/1964 Bertele _____ 88—57

FOREIGN PATENTS 575,975 5/1959 Canada.

JEWELL H. PEDERSEN, *Primary Examiner.*

DAVID H. RUBIN, R. J. STERN, *Assistant Examiners.*